United States Patent
Krishan

(10) Patent No.: US 10,491,588 B2
(45) Date of Patent: Nov. 26, 2019

(54) LOCAL AND REMOTE ACCESS APPARATUS AND SYSTEM FOR PASSWORD STORAGE AND MANAGEMENT

(71) Applicant: Baldev Krishan, Pleasanton, CA (US)

(72) Inventor: Baldev Krishan, Pleasanton, CA (US)

( * ) Notice: Subject to any disclaimer, the term of this patent is extended or adjusted under 35 U.S.C. 154(b) by 95 days.

(21) Appl. No.: 15/636,827

(22) Filed: Jun. 29, 2017

(65) Prior Publication Data

US 2017/0310663 A1  Oct. 26, 2017

Related U.S. Application Data

(60) Provisional application No. 62/475,306, filed on Mar. 23, 2017.

(51) Int. Cl.
| | | |
|---|---|---|
| *H04L 29/06* | (2006.01) | |
| *H04W 12/06* | (2009.01) | |
| *H04W 12/04* | (2009.01) | |
| *H04W 12/08* | (2009.01) | |

(52) U.S. Cl.
CPC .......... *H04L 63/0853* (2013.01); *H04L 63/06* (2013.01); *H04L 63/083* (2013.01); *H04L 63/0861* (2013.01); *H04L 63/108* (2013.01); *H04L 63/166* (2013.01);
(Continued)

(58) Field of Classification Search
CPC ............. H04L 63/0853; H04L 63/0861; H04L 63/083; H04L 63/108; H04L 63/06; H04L 63/166; H04L 2463/082; H04W 12/08; H04W 12/06; H04W 12/04
See application file for complete search history.

(56) References Cited

U.S. PATENT DOCUMENTS

| | | | |
|---|---|---|---|
| 7,483,984 B1 * | 1/2009 | Jonker | .................. H04L 41/22 709/203 |
| 7,945,034 B2 | 5/2011 | Gonen et al. | |
| 8,462,920 B2 | 6/2013 | Gonen et al. | |

(Continued)

OTHER PUBLICATIONS

Yang et al., "Cloud Password Manager Using Privacy-Preserved Biometrics", 2014, IEEE, pp. 505-509. (Year: 2014).*

(Continued)

*Primary Examiner* — Matthew Smithers
(74) *Attorney, Agent, or Firm* — Eversheds Sutherland (US) LLP; Nicola A. Pisano; Christopher C. Bolten

(57) ABSTRACT

The present invention is a user credentials' storage and management system installed on the local network consisting of a secured depository of usernames and passwords which can be locally/remotely accessed only by the user after authentication. The user account contains all user credentials' which are stored in a device connected to local network. The user credentials' are stored in a device, which can be accessed by the user via WiFi/Ethernet/etc. The server provides the first level of authentication which connects the user post authentication by computing device to the storage device. The user has to run the required web page, after which the application accesses the user credentials' account, extracts the login credentials and automatically fills or can be manually filled in the appropriate fields. In the case of accessing multiple accounts, then the user credentials; can be copy-pasted from them account and can terminate the session.

18 Claims, 4 Drawing Sheets

(52) U.S. Cl.
CPC .......... *H04W 12/04* (2013.01); *H04W 12/06* (2013.01); *H04W 12/08* (2013.01); *H04L 2463/082* (2013.01)

(56) References Cited

U.S. PATENT DOCUMENTS

| | | | |
|---|---|---|---|
| 8,687,038 | B2 | 4/2014 | Gonen et al. |
| 8,914,855 | B2* | 12/2014 | Whitmyer, Jr. ......... G06F 21/34 726/5 |
| 9,088,556 | B2* | 7/2015 | Truskovsky ............ H04L 63/08 |
| 9,300,792 | B2 | 3/2016 | Gonen et al. |
| 9,467,443 | B2* | 10/2016 | Mohan ................ H04L 63/0846 |
| 9,767,262 | B1* | 9/2017 | Canavor ............ G06F 21/6218 |
| 9,860,241 | B2 | 1/2018 | Dixon et al. |
| 10,021,088 | B2* | 7/2018 | Innes ................ H04L 63/0823 |
| 10,055,575 | B2* | 8/2018 | Adams .................... G06F 21/46 |
| 10,146,931 | B1* | 12/2018 | Kronrod ................ G06F 21/45 |
| 2004/0193925 | A1* | 9/2004 | Safriel .................... G06F 21/31 726/6 |
| 2006/0183462 | A1* | 8/2006 | Kolehmainen .......... H04B 5/00 455/411 |
| 2007/0074038 | A1* | 3/2007 | Arenburg ............. H04L 9/3226 713/181 |
| 2013/0179692 | A1 | 7/2013 | Tolba et al. |
| 2014/0101453 | A1 | 4/2014 | Senthurpandi |
| 2014/0173708 | A1* | 6/2014 | Garlick .................. H04L 63/08 726/7 |
| 2015/0143490 | A1* | 5/2015 | Fang .................. G06Q 20/4014 726/6 |
| 2015/0278510 | A1* | 10/2015 | Alexander ............. G06F 21/45 726/6 |
| 2016/0057136 | A1* | 2/2016 | Wang ...................... G06F 21/45 713/172 |
| 2017/0086069 | A1* | 3/2017 | Liu ....................... H04W 12/06 |
| 2017/0142191 | A1* | 5/2017 | Caldwell ................ H04L 67/20 |
| 2017/0201513 | A1* | 7/2017 | Krempel ............. H04L 63/0428 |
| 2018/0005209 | A1* | 1/2018 | Ranganathan ......... G06Q 20/12 |
| 2018/0075231 | A1* | 3/2018 | Subramanian .......... G06F 21/41 |
| 2018/0183779 | A1 | 6/2018 | Krishan |

OTHER PUBLICATIONS

Faisca et al., "Decentralized Semantic Identity", 2016, ACM, pp. 1-4. (Year: 2016).*

Wang et al., "IDKeeper: A Web Password Manager with Roaming Capability Based on USB Key", 2012, IEEE, pp. 1228-1231. (Year: 2012).*

Agholor et al.; "A Secured Mobile-Based Password Manager", 2016, IEEE, pp. 103-108. (Year: 2016).*

Publiation-3: A downloadable Plugin available to the general public at the Google Chrome Store. Four Screen Shots from the website. Published in Jan. 2015. Developed and published by iKeyPass, Inc. and was available for download to the general public since Jan. 2015. The Plugin can be currently viewed and downloaded at https://chrome.google.com/webstore/detail/byoa/nbnkenkheongc-comnjibebdfjlcpcefh?hl=en.†

Publication-2: A Plugin for WordPress Administrators. Four Screen Shots (pages) from the website. First Published in Oct. 2014. Developed and published by iKeyPass, Inc. and was available for download to the general public since 2014. The Plugin can be currently viewed and downloaded at https://wordpress.org/plugins/search/ikeypass/.†

Publication-1: iKeyVault Website (formally under iKeyPass). Four Screen Shots (pages). Published in Oct. 2016. Developed and published by Janani Mohan, prior to launching a crowd funding campaign with the crowd funding site Indiegogo, in Q1/Q2 2017, and distributed to the general public. The website can be accessed at www.ikeyvault.com.†

\* cited by examiner
† cited by third party

LOCAL AND REMOTE ACCESS APPARATUS AND SYSTEM FOR PASSWORD STORAGE AND MANAGEMENT

FIELD OF THE INVENTION

The present invention relates generally to a security system and more particularly to a security system and the related apparatus used for user login credentials' (such as user name and/or passwords, security questions) storage and management that can be accessed locally and/or remotely.

BACKGROUND OF THE INVENTION

We all live in a world where the use of internet has become part of our daily life. On one hand, it has made life easier to access the information, transactions, email access and other on-line services but on the other hand, the same data which has been used for email access, transactions etc. are being used to commit fraud and stealing identities, money etc. Because of this, the users, institutions and organizations are losing billions of dollars with no end in sight. Also, the businesses are increasingly using e-mail for critical functions, such as high-level commercial negotiations and transactions. Along with this increased and highly sensitive usage is a growing demand for electronic communications to be both private and authentic.

Also because of the ease of using internet which is accessible not only through personal computers and laptops hut also through the smartphones and smart watches, the transactions can be done easily from anywhere and at any time. This has made the system vulnerable to cyber-attacks that leads the users to incur losses in several dollars to several millions and billions of dollars.

The ease of access with the internet is reason for most of the users to create and deal with more than one online accounts requiring different usernames and passwords. The users are expected to remember all the usernames and password in order to get access to their accounts. When there are more than one online accounts with different passwords, the users tends to store the usernames and the corresponding passwords either written in a paper, as a text file in their personal computers and laptops or as a note in their smartphones. Also in some cases, the users write them on a note and put it next to their personal computer or laptop. It is very risky to leave such sensitive information unattended as other might steal it and use it for their benefits, to commit frauds or also to make fortunes.

In the past, when e-mail was routed within internal networks, the physical security of that network typically ensured that e-mails were secure. But now, the increasing dependency on the internet for various types of communications, makes the security measures highly important. The security can be possible with the help of physical security or with internal security i.e. with the help of data encryption. Providing security to the internet physically is not a feasible option hence the other option that is easily opted by the users are the various forms of encryption which provides the security.

One such kind of encryption that is being currently used in through the Public key encryption (PKE) which is typically used for securing communications over the internet. The PKE uses two different keys for encrypting the data i.e. a public key, and a private key. Each communicator are provided with a public key and also a private key which is kept secret. In, this system, the public key is used for encryption of the data and the private key is used for decryption of the same data. There are several disadvantages of the PKE system and the protocols based on it. The system is highly complicated and the implementation of the system would require more keys as the provided keys would not be enough. Also the speed of the operation lags in time and the algorithms which are used in the system are highly complex making it difficult to alter.

A prior art patent U.S. Pat. No. 9,467,443 B2 describes an authentication utilizing a dynamic passcode from a user-defined formula based on a changing parameter value wherein the authentication system utilizes dynamic passcode from a user-defined formula based on a changing parameter value in which the changing parameter is publicly accessible through the communication network and has a current value that is periodically updated, such as a stock value, temperature at a specific location, or a sports score. The user-defined formula is based on the changing parameter in order to derive a passcode which authenticates a user to an associated user account. As referred to herein, the user-defined formula is a mathematical formula in which the changing parameter is one variable (e.g., [changing parameter value]+1). Some formulas include more than one changing parameter.

Other online solutions which are available for password storage and management are the password manager software application along with the hardware that usually store user names and passwords in encrypted form and requires the user to create a master password which is a single strong password that grants the user access to their entire password database. Some of the password managing software also stores the passwords on the user's computer which are also known as the offline password managers, whereas other password managing software store the data in the provider's cloud which are also known as the online password managers.

The user credentials' (such as user names and passwords) storage and management software can be based on different criteria including web-based, cloud-based, portable, desktop, offline, tokens and stateless. The web-based password storage and management software are those in which the passwords are stored online and are viewed and copied to/from a provider's, website. The cloud-based password storage and management software are those in which the passwords are stored online on a service provider's servers on the Internet, but handled by password management software running on the client's machine. The portable password storage and management software are those in which the portable software enables storing of the passwords and program on a mobile device, such as a PDA, smart phone, or as a portable application on a USB memory stick etc. The desktop password storage and management software are those in which the desktop or laptop software is used for storing the passwords on a computer hard drive which can be either offline or cloud based. The offline password storage and management software is the independent software which keeps the passwords locally on the device being used. The token password storage and management software, is the one in which the passwords are protected using a security token, thus typically offering multi-factor authentication by combining something the user has such as a mobile application that generates rolling a token similar to virtual smart card, smart card and USB stick, PIN or password and/or something the user is like biometrics such as a fingerprint, hand, retina, or face scanner. The stateless password storage and management software is the one in which the passwords are generated on the fly from a master passphrase and a tag using a key derivation function.

There are various shortcomings of the existing systems that are vulnerable theft, fraud and data leak. The main disadvantages of the existing systems are the authorization and authentication issues, bookmarklet issues wherein the malicious website can steal a user's password, user Interface issues wherein the frauds can capture the user's credentials, web issues wherein the XSS and CSRF vulnerabilities may be exploited by hackers to obtain a user's password and many more. Furthermore in the existing systems, if the hacker or malware gets a single password of any user's account, then they can gain access to all of a user's passwords and can cause unpredictable damage.

Therefore, there is a need for a secure system which can provide a high security system to store and manage the user names and passwords of a user that can be accessed only by the user more securely and remotely and/or locally.

OBJECTS OF THE INVENTION

It is the primary, objective of the present invention is to provide a user credentials' storage and management system that stores the username and corresponding passwords in a secured depositor) device connected to the local network under user and/or enterprise control.

Another objective of the present invention is to provide a user credentials' storage and management system that only be opened (with a browser or an end user application) by the user after the user is authenticated the system.

Another objective of the present invention is to provide a user credentials' storage and management system that requires the user to register and save their confidential login details for various on-line accounts.

Another objective of the present invention is to provide a user credentials' storage and management system in which the user can open their vault with a login-key and only one account at a time or multiple accounts.

Another objective of the present invention is to provide a user credentials' storage and management system in which the user is provided access to the storage device either locally or remotely which is connected in the local network.

Another objective of the present invention is to provide a user credentials' storage and management system wherein the credentials' storage device can be configured for either local access only or local and remote access together.

SUMMARY OF THE INVENTION

The present invention describes a user credentials' storage and management system which is a secured depositing of the user's user-names and passwords which can securely and remotely accessed via the local area network or via the internet, only by the user after the user is authenticated by the system. The user can access the information from their account with a browser or an end user application.

The present invention overcomes the shortcomings of the prior arts to provide an easy and secure option for the user credentials' storage and management. The present invention eliminates the need for the user to remember usernames and the corresponding passwords and/or posting these credentials on the wall or other place convenient to the user. The user credentials' storage and management system basically acts like a secret vault, where user can register and save their confidential login details for various on-line accounts. Once the user is registered in the system, only then user is granted with the access to their secret vault with a unique login-key. With the login-key the user can access only one account at a time or multiple accounts at a time, based on their necessity and requirement.

The account created by the user is secured with high security so that the account can only be accessed and the information can be retrieved only by the person who created the account in the system. Also the businesses can provide a similar secure system for storing usernames and passwords and each authorized person or the user is given access to the vault or the system with their login-key. The login-key is basically a system which is used to authenticate the user and check whether it is the user themselves or any imposter or fraud. The user authentication that can be adopted in the system may be based on various criteria including user name and password; user name, password and/or biometrics; user name, password, and token; user name, password, and Short messaging Service (SMS) code; user name, password, and the second factor of the user authentication which can be a dynamic passcode from a user-defined formula based on a changing parameter value and any other means of user authentication.

The user credentials' storage and management system basically comprises of a software application, a login-key and an account comprising of all the user credentials. The operation of the user credentials' management system requires the user to run the software application in their device i.e. smartphone, laptop etc. and the user should provide the login-key which is unique to every user in order to gain access to their credentials through that device only. Once the user provides the login-key, they have to open the website which they want to access and whose login credentials are required. The software application accesses the account of the user in which all the usernames and passwords of various accounts are preciously saved and it extracts the specific login credentials of that particular website and automatically fills them up in the appropriate fields or can be manually filled in the opened webpage. If the user is accessing multiple accounts, then the login credentials can be copied and pasted from them account. The software application can also be programmed to automatically fill the login credentials in the appropriate place. Once the credentials are provided, the user is granted access and after the work is completed, the user can terminate the access provided in the particular device.

The present invention can also be used to remotely access the usernames and passwords of the users which are stored in the vault (storage device) with the help of a server. The server provides the first level of authentication of the users when the users provide the login details and the unique key. After the users provide the login details along with the unique key, the server receives the data, authenticates it and sends it to the password vault which successfully verities the provided credentials. The server acts as a tunnel and it allows the user to access their usernames and passwords that are stored in the password vault and the data from the vault is sent to the server in the encrypted form which is forwarded to the user's device through the server in encrypted form on an HTTPS channel. The server is, also linked to a database which maintains the list of the storage vaults and also the login details to the server of the users. The storage vaults can be accessed either through the mobile device, personal computer, laptop, tablet etc, by the users after the users provide the login unique identification ID, password and the unique key to identify the device.

DETAILED DESCRIPTION OF THE INVENTION

The present invention describes a user credentials' storage and management system which is a secured depository (standalone or built into existing device on the Local Area Network) of the user's usernames and password which can securely and locally and/or remotely accessed only by the user after the user is authenticated by the system. The user can access the information from their, account with a browser or an end user application.

The present invention comprises of a device to store the usernames and passwords, internal network connection via WiFi or Ethernet, an access point or a router, a device to connect to the access point or the router, a server and an end user software application. The device which is used for storing the usernames and passwords is connected to the internal network of the user via WiFi or Ethernet which is also connected to the server. The device stores the usernames and passwords and login key or keys to give access to the users. This device also, connected to the focal network via WiFi or Ethernet or any other kind of technology. The server provides the interface to connect the user with the device and the end user software application can run on any of these platforms i.e. windows, android, Linux, IOS, RTOS etc., and provides the ability to login to the device with the login-key.

The account created by the user is secure and can only be accessed and the information can be retrieved only by the user themselves. The user credentials' storage and management system stores the usernames and passwords and each authorized user is provided access to their account with a login-key. The login-key is basically a system which is used to authenticate the user and cheek whether it is the user themselves or any imposter or fraud. The user authentication can be done in various ways like using user name and password; user name, password and/or biometrics; user name, password, and token; user name, password, and Short messaging Service (SMS) code; user name, password, and the second factor of the user authentication which can be a dynamic passcode from a user-defined formula based on a changing parameter value and any other means of user authentication.

Figure 1:
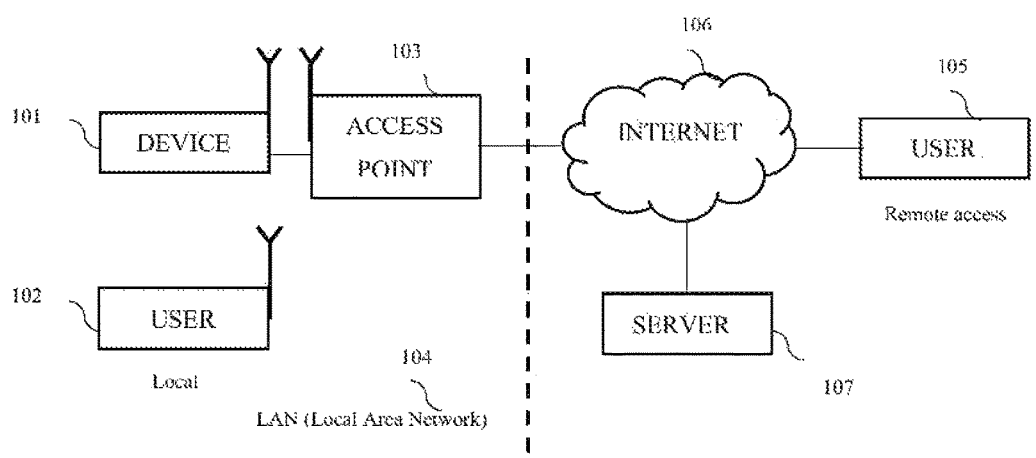
FIG. 1 illustrates the schematic representation of the user credentials' storage and management system connected through a WiFi connection.

FIG. 1 illustrates the schematic representation of the user credentials' storage and management system. The user credentials' storage and management system comprises of a device 101 which stores the usernames and passwords i.e. login credentials of the user 102 is connected to the internal network of the user through the WiFi. The device 101 is connected to the access point 103 which is also connected to the internet 106 i.e. WiFi. The user can use the WiFi through the local area network connection 104. Once the user 105 runs the software application in their device, they are remotely connected to the access point 103 through the internet 106 i.e. WiFi connection. Once the connection is made, user 105 can login into their account through the login-key and gain access to their account which comprises of the usernames and the passwords and the server 107 provides the interface to connect the user with the device.

Figure 2:
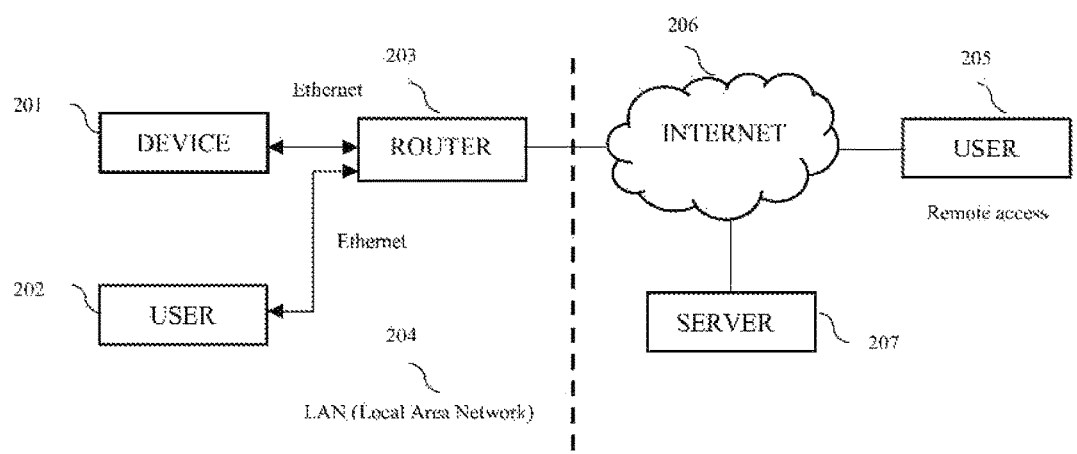
FIG. 2 illustrates the schematic representation of the user credentials' storage and management system through an Ethernet connection.

Similarly, the user credentials' storage and management system can also be connected internally through an Ethernet connection which is described in FIG. 2. FIG. 2 illustrates the schematic representation of the user credentials' storage and management system through a router connection. FIG. 2 illustrates the user credentials' storage and management system which comprises of a device 201 which stores the usernames and passwords i.e. login credentials of the user 202 is connected to the internal network of the user through the Ethernet. The Ethernet connection requires a router 203 in order to connect the system through a local network connection 204. The device 201 is connected to the router 203 through an Ethernet connection which provides the internet connection 206 which can be used by the user 205 in order to store and manage the usernames and passwords. Once the user 205 runs the software application in their device, they are remotely connected to the router 203 through the internet 206 i.e. Ethernet connection and once the connection is made, the user 205 can login into their account through the login-key and gain access to their account which comprises of the usernames and the passwords and the server 207 provides the interface to connect the user with the device.

Figure 3:
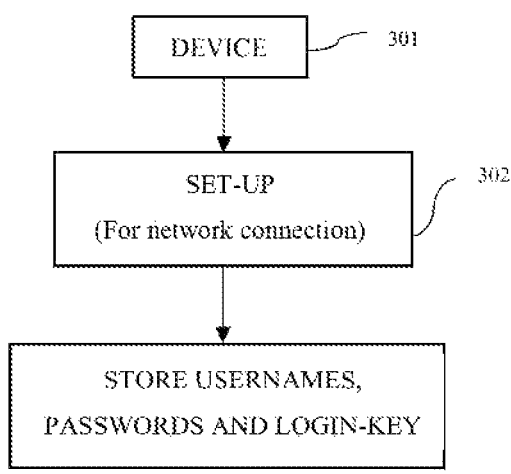
FIG. 3 illustrates the schematic representation of the set up process of the user credentials' storage and management system.

FIG. 3 illustrates the schematic representation of the set up process of the user credentials' storage and management system. The device 301 in which the usernames and the passwords have to be stored is connected to a network connection i.e. through WiFi or Ethernet in order to set-up 302 the system. Once the set-up 302 of the device 301 is successfully completed, an account will be created for the user in which they can store their login credentials i.e. usernames and passwords and login-key in their account. Once the login credentials are successfully stored in the system, the user can use their own device which works on any platform like windows, android etc. to access their login credentials remotely.

The method of the user credentials' storage and management system comprises of a software application, a login-key and an account comprising of all the user credentials. The user has to run the software application in their device for example, smartphone, a personal computer, a laptop etc. When the user runs the application in any device, the user is provided with the access to their credentials only in that device with the help of a login-key. The user can also connect to the server by typing the Uniform Resource Locator (URL) for the server. Then the user has to provide the Uniform Resource Locator (URL) of the website for which the credentials are required for example: www.facebook.com. The software application accesses the account of the user in which all the usernames and passwords of various accounts of the user is saved and it extracts the login credentials of that particular website and automatically fills them up in the appropriate fields in the opened webpage. The software application can also be programmed to automatically fill the login credentials in the appropriate place. When the user wants to login in various accounts, they can copy and paste the login credentials manually for every website and can terminate the access to the account manually. Once the credentials are provided, the user is granted access and after the work is completed, the user can terminate the access provided in the particular device.

Figure 4:
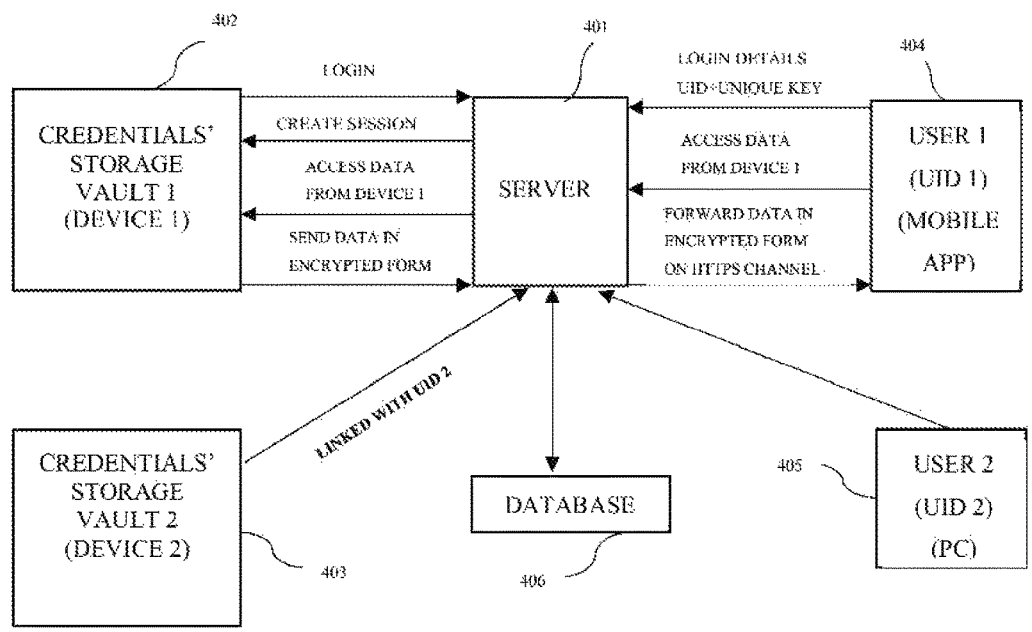
FIG. 4 illustrates the schematic representation of the user credentials' storage and management system showing the server (with public IP) that can be used to make the data accessible over the web for all users.

FIG. 4 illustrates the schematic representation of the user credentials' storage and management system in which the server can be used to make the data accessible over the web for all its users. Basically the server 401 acts as a public access point for all the devices that stores the user names and passwords. All the devices which are remotely accessed by the users can reach there device which stores the usernames and passwords through this fixed internet protocol (IP) or the server domain. The server 401 is connected to the credentials' storage vault 1 402, credentials' storage vault 2 403 and the database 406. The server 401 will provide the https access to users i.e. user 1 404 who is accessing the system through a mobile phone application and user 2 405 who is accessing the system through, a personal computer. The user 1 404 and user 2 405 have to login to their account with the help of the unique identification number (UID) along with a unique key to identify their device which can either be a smartphone or a personal computer or a laptop etc. While setting up the system in their local devices, the user has to add or feed them on the web interface to link it with their unique key. After initial set up, the user can access their password vault whenever they want in order to retrieve the username and passwords which is similar to accessing the data locally. The credentials' storage vault 1 402 is linked with UID 1 and the credentials' storage vault 2 403 is linked with UID 2 wherein the user 1 404 who is using the mobile device can access the data from the credentials' storage vault 1 402 and the user 2 405 who is using a personal computer can access the data from the credentials' storage vault 2 403. The server 401 in real, does not hold any of the data related to the user as it simply acts as a tunnel between the device and current user location. The users can access their credentials' storage vaults from any of their devices which are suitable to them such as mobile phone, personal computer, laptop, tablet as the present invention is compatible with all forms of devices.

When the user 1 404 provides the login details i.e. the UID 1 and the unique key, the server 401 receives the data and sends it to the credentials' storage vault 1 402 which confirms the login after the successful verification of the provided credentials. The server allows the user to access their usernames and passwords that are stored in the credentials' storage vault 1 402 and during this access, a session is created wherein the requested data in encrypted form is sent to the user's device through the server and the user's device receives the sent data on an Hyper Text Transfer Protocol Secure (HTTPS) channel. The server 401 is also linked to a database 406 which maintains the credentials' storage vault 1 402 and credentials' storage vault 2 403 and also the UID links.

On the other side, the devices which are being used by the user will boot and try to establish a Transmission Control Protocol (TCP) connection with the server 401. TCP is a standard that defines how to establish and maintain a network conversation through which the software application programs can exchange data. TCP works with the Internet Protocol (IP), winch defines how computers send packets of data to each other. Once the connection is established successfully, the device will mark its status as active and it will be ready to respond to the queries submitted by the user from anywhere and at any time. The requests made by the users for either retrieval or saving new passwords will be handled by the device firmware although routed through the server 401. The traffic between the device and the server is encrypted by unique device key and can only be decrypted at user end with users key.

The present invention is not only limited to be used in the above mentioned platforms, but can also be developed further to be used in various platforms.

I claim:

1. A user credentials' storage and management system comprising a storage device including usernames and passwords stored thereon that is connected to an internal network, an access point or a router, a user device to connect to the access point or router, a server to provide an interface between the user device and the storage device, the server connected to the internal network, and a software application, the software application comprising programmed instructions to:
    login the user device with a login-key identifying the user and a unique key identifying the user device;
    access an account on the storage device to retrieve the stored usernames and passwords; and
    automatically populate fields in an opened webpage with the retrieved usernames and passwords.

2. The user credentials' storage and management system of claim 1, wherein the software application which is used for login management residing on a portable device or a non-portable device, can be connected to a computerized terminal or device.

3. The user credentials' storage and management system of claim 1, wherein the account created by the user is secure and can only be accessed and the information can be retrieved only by the user.

4. The user credentials' storage and management system of claim 1, wherein the usernames and passwords are stored in the account which can be accessed only by an authorized user who can access their account with a login-key or any other user authentication system.

5. The user credentials' storage and management system of claim 4, wherein the login-key is used to authenticate the user, which can be done using user-name and password; user-name, password and/or biometrics; user-name password, and token; user-name, password, and Short messaging Service (SMS) code; and user-name, password, and the second factor of the user authentication which can be a dynamic passcode from a user-defined formula based on a changing parameter value.

6. The user credentials' storage and management system of claim 1, wherein the storage device can also be connected internally through an Ethernet or WiFi or some other communication means or connection.

7. The user credentials' storage and management system of claim 1, wherein the server is connected to the plurality of credential's storage vaults and a database, and the server provides the https access to users to access the system through a mobile phone application or through a personal computer or device.

8. The user credentials' storage and management system of claim 7, wherein the server is provided for remote access to the credentials' storage device.

9. The user credentials' storage and management system of claim 1, wherein the users have to login to their account with the help of the unique identification number (UID) along with a unique key to identify their device which can either be a smartphone or a personal computer or a laptop etc. in order to gain access to their account.

10. The user credentials' storage and management system of claim 9, wherein when the user provides the login details and the unique key, the server receives the data and sends it to the credentials' storage vault to authenticate the user.

11. The user credentials' storage and management system of claim 1, wherein the server allows the user to access their usernames and passwords through a session in which the requested data in encrypted form is sent to the user's device through the server and the user's device receives the sent data on an Hyper Text Transfer Protocol Secure (HTTPS) channel.

12. A method of user credentials' storage and management comprising:

storing user-names and passwords of a user in a storage device;

connecting the storage device to a user device through an access point and an internet;

initiating and running the software application in the user device;

logging in the user device with a login-key identifying the user and a unique key identifying the user device;

accessing an account in the storage device through login-key to retrieve the usernames and passwords; and automatically populating fields in an opened webpage with the retrieved usernames and passwords.

13. The method of user credentials' storage and management of claim 12, wherein a set-up process has to be made to the storage device in which the usernames and the passwords have to be stored.

14. The method of user credentials' storage and management of claim 13, wherein the storage device set-up is made by connecting it to a network connection i.e. through WiFi or Ethernet.

15. The method of user credentials' storage and management of claim 12, wherein device set-up creates an account for every user in which they can store their usernames and passwords and login-key in their account.

16. The method of user credentials' storage and management of claim 12, wherein the storage device which is connected to the local network, can be configured for only local access, or both local and remote access.

17. The method of user credentials' storage and management of claim 12, wherein the user can access their data by running the software application in their device i.e. smartphone, a personal computer, a laptop etc.; providing the usernames and passwords along with the login-key; accessing the user account by the software application which contains the usernames and passwords of various accounts of the user; extracting the usernames and passwords of required or selected website; and automatically filling up the fields in the opened webpage through the software application; granting access to the user and terminating the access provided in the particular device after work is done.

18. The method of user credentials' storage and management of claim 12, wherein the user can also connect to the server by typing the Uniform Resource Locator (URL) for the server for which the usernames and passwords are required.

* * * * *